United States Patent [19]

Horiuchi et al.

[11] Patent Number: 5,506,292
[45] Date of Patent: Apr. 9, 1996

[54] COATED GOLF BALL

[75] Inventors: Kuniyasu Horiuchi; Kiyoto Maruoka, both of Kobe, Japan

[73] Assignee: Sumitomo Rubber Industries, Ltd., Hyogo, Japan

[21] Appl. No.: 267,255

[22] Filed: Jun. 29, 1994

[30] Foreign Application Priority Data

Jun. 29, 1993 [JP] Japan .................................. 5-158640

[51] Int. Cl.$^6$ .................................. A63B 37/12
[52] U.S. Cl. .................. 524/430; 524/908; 273/235 A; 273/235 R
[58] Field of Search .................. 273/235 A, 235 R; 524/908, 430

[56] References Cited

U.S. PATENT DOCUMENTS

| | | | |
|---|---|---|---|
| 4,679,794 | 7/1987 | Yamada | 273/235 R |
| 4,679,795 | 7/1987 | Melvin | 273/235 R |
| 5,029,870 | 7/1991 | Concepcion | 273/235 A |

*Primary Examiner*—Joseph L. Schofer
*Assistant Examiner*—I. Zemel
*Attorney, Agent, or Firm*—Birch, Stewart, Kolasch & Birch

[57] ABSTRACT

The present invention provides a coated golf ball wherein the whitening of the color tone is enhanced and weathering properties are improved. The golf ball body having a cover mainly composed of an ionomer resin is coated with a white paint. The paint layer of the coated golf ball comprises at least one white paint layer and at least one clear paint layer. The white paint comprises 3 to 15% by weight of a white pigment, 0.0005 to 0.0250% by weight of a blue pigment and 0.001 to 0.010% by weight of a red pigment, based on 100% by weight of the solid content of the coating. The weight ratio of the blue pigment to the red pigment is 0.1 to 2.0.

8 Claims, No Drawings

COATED GOLF BALL

FIELD OF THE INVENTION

The present invention relates to a coated golf ball in which the golf ball body is coated with a paint. More particularly, the present invention relates to a coated golf ball wherein the whitening of the color tone is enhanced and the weathering properties thereof are improved.

BACKGROUND OF THE INVENTION

A golf ball is roughly classified into three types, i.e. a golf ball having a balata cover, a golf ball coated with a cover mainly composed of an ionomer resin and an integrally molded type one-piece golf ball. All three of these golf balls are normally treated so that a white appearance is imparted thereto.

A golf ball having a balata cover is coated with a paint containing a large amount of a white pigment so as to cover the slightly subdued color of the balata cover itself.

In case of a golf ball coated with a cover mainly composed of an ionomer resin, the ionomer resin itself is transparent and the white pigment can also be formulated in the ionomer resin itself. Therefore, a white appearance can sometimes be obtained by only providing a clear layer without using the white paint. Even in the case of a golf ball having an ionomer resin cover, adhesion after weathering is inferior when only a clear layer is provided. Furthermore, since the color tone depends upon the cover layer, sufficient whiteness can not be obtained. Particularly, the golf ball can not be seen easily on green grass and, therefore, it is difficult to putt the golf ball.

In order to improve the whiteness of the golf ball to enhance the commercial value thereof, U.S. Pat. No. 5,029,870 suggests to formulate a suitable amount of blue and violet pigments in a white paint. However, the appearance of the resulting coated golf ball becomes dark white and, therefore, the golf ball cannot be readily seen while putting.

SUMMARY OF THE INVENTION

Under these circumstances, and in order to solve the above problems, the present inventors have undergone an intense investigation. As a result, the present invention has been completed.

The main object of the present invention is to provide a coated golf ball wherein the whitening of the color tone is enhanced and the weathering properties are improved.

This object as well as other objects and advantages of the present invention will become apparent to those skilled in the art from the following description.

That is, the present invention provides a coated golf ball in which the golf ball body has a cover composed mainly of an ionomer resin coated with a white paint, the paint layer of said golf ball comprising at least one white paint layer and at least one clear paint layer, said white paint comprising 3 to 15% by weight of a white pigment, 0.0005 to 0.0250% by weight of a blue pigment and 0.001 to 0.010% by weight of a red pigment based on 100% by weight, based on the solid content of the coating, the weight ratio of the blue pigment to the red pigment being 0.1 to 2.0.

As the white paint in the present invention, there can be used an epoxy, acrylic or urethane paint. Particularly, a urethane paint is preferred. For example, a white paint prepared by reacting an active hydrogen-containing compound (e.g. polyester polyol, polyether polyol, etc.) as a main material with an isocyanate compound as a curing agent is preferred. As the isocyanate compound, a 1,6-hexamethylene diisocyanate modified material (e.g. biulet material, trimethylolpropane modification, trimer, etc.) is preferred. A tolylene diisocyanate modified material is also preferred.

The white paint contains a white pigment in an amount of 3 to 15% by weight based on the solid content of the coating. The white pigment may be those which have hitherto been used for golf balls, and titanium oxide and barium sulfate are suitably used. When the amount of the white pigment is smaller than 3% by weight, the weathering resistance becomes inferior. On the other hand, when the amount exceeds 15% by weight, the transparency and weighty appearance become poor, and it is not preferred in view of appearance. The amount is preferably 5 to 12% by weight.

In addition to the above components, various additives, curing catalysts and diluents are formulated in the white paint. Examples of the additive include ultraviolet inhibitors, fluid agents, sealing pigments, fluorescent agent, fluorescent brighteners and the like. The amount of these additives is 0.1 to 10% by weight based on the solid content of the coating.

As the fluorescent agent or fluorescent brightener contained in the white paint, for example, there are those which are normally known and are used for the golf ball. Examples thereof include 2,5-bis[5'-t-butylbenzoxazolyl (2)]thiophene (commercially available from Japan Ciba Geigy Co. as Yubitex OB), 7-(2h-naphthol(1,2-d)-triazol-2-Y1)-3-phenyl-cusline (commercially available from Sanzos Co. as Leucopure EGM), biazoline derivative (commercially available from Mobey Chemical Corporation as Phorwhite K-2002), oxazoles (commercially available from Sumitomo Chemical Co., Ltd. as Whitefullar HCS, PCS, B), fluorescent brightener (commercially available from Hoechst Japan Co. as Hostalux KCB) and the like. The amount thereof is 0.005 to 1.0% by weight based on the solid content of the coating.

Examples of the diluent formulated in the white paint include ketones such as acetone, methyl ethyl ketone, etc.; aromatic hydrocarbons such as toluene, xylene, etc.; esters such as ethyl acetate, etc. The amount of the diluent is not specifically limited, but it is generally 30 to 80% by weight.

As the blue pigment, for example, phthalocyanine blue, indanthron blue, ultramarine blue, fast sky blue, cobalt blue or fanatone blue 6G, or a mixture thereof can be suitably used. The amount of the blue pigment is 0.0005 to 0.25% by weight based on the solid content of the coating. When the amount is not within the above range, sufficient whiteness cannot be obtained. The amount is preferably 0.0008 to 0.020% by weight.

As the red pigment, for example, quinacridone magenta or permanent red fast scarlet VD, or a mixture thereof can be suitably used. The amount of the red pigment is 0.001 to 0.010% by weight based on the solid content of the coating. When the amount is not within the above range, sufficient whiteness can not be obtained. The amount is preferably 0.0012 to 0.008% by weight.

By coating the above paint on the golf ball body, the color tone of the coated golf ball shows an L value of 85 to 95, an a value of 0 to 2.0, a b value of −6.5 to −10.0, a Wcie value of 108 to 125, a Tw value of 2 to 5 and a Wcie/Tw value of 22 to 50. When these values are not within the above ranges, the resulting coated golf ball does not achieve the desired whiteness. Preferable, it shows an a value of 0.05 to 1.5 and a b value of −7.0 to −9.5. These values are measured by a colorimeter available from Minolta Co., Osaka, Japan.

The golf ball body has a cover mainly composed of an ionomer resin. The resin for the cover may contain various pigments. It is preferred that 1 to 6 parts by weight of the white pigment and 0.002 to 0.08 parts by weight of the blue pigment are formulated in 100 parts by weight of the resin for the cover. As the white pigment, there can be preferably used titanium oxide or barium sulfate, or a mixture thereof. As the blue pigment, there can be used various pigments which have hitherto been known.

The coated golf ball of the present invention can be produced by applying the clear paint after the white paint is applied onto the golf ball body, a plurality of times. The clear paint is one which essentially contains no pigment, and there can be used an epoxy, acrylic or urethane paint. The clear paint is known as to the production of the golf ball.

According to the present invention, a coated golf ball wherein the whitening of the color tone is enhanced and the weathering properties are improved, can be obtained.

EXAMPLES

The following Examples and Comparative Examples further illustrate the present invention in detail but are not to be construed to limit the scope thereof.

Examples 1 to 5 and Comparative Examples 1 to 3

Paints A to E (Examples) and paints F to H (Comparative Examples) were prepared by mixing the components shown in Table 1 according to a conventional method.

On the golf ball body with a cover made from a resin prepared by formulating 4 parts by weight of a white pigment (e.g. titanium oxide or barium sulfate) and 0.02 parts by weight of a blue pigment (e.g. ultramarine blue) in 100 parts by weight of a resin mainly composed of an ionomer resin, a white coat of two layers was formed using the above paint. Thereafter, the color tone, the feature of appearance, the color tone due to visual observation and the bond strength after weathering test were evaluated. The kind of paint used and test results are shown in Table 2, below.

TABLE 1

|  | Example No. |  |  |  |  | Comparative Example No. |  |  |
|---|---|---|---|---|---|---|---|---|
|  | A | B | C | D | E | F | G | H |
| [Formulation] Amount: (% by weight based on the solid content of the coat) | | | | | | | | |
| Kind of resin | Epoxy | Epoxy | Urethane | Urethane | Urethane | Epoxy | Urethane | Urethane |
| White pigment (Titanium oxide) | 10 | 5 | 10 | 10 | 5 | 10 | 10 | 10 |
| Blue pigment (Phthalocyanine blue) | 0.001 | 0.001 | 0.0035 | 0.010 | 0.002 | 0.040 | 0.003 | 0.0003 |
| Red pigment (Quinacridone magenta) | 0.0015 | 0.005 | 0.0020 | 0.015 | 0.005 | 0.0030 |  | 0.0008 |
| Violet pigment (Dioxazine) |  |  |  |  |  |  | 0.002 |  |
| Blue pigment/Red pigment | 0.67 | 0.20 | 1.75 | 0.67 | 0.40 | 13.30 | 1.50 | 0.38 |

TABLE 2

|  | Example No. |  |  |  |  | Comparative Example No. |  |  |  |
|---|---|---|---|---|---|---|---|---|---|
|  | 1 | 2 | 3 | 4 | 5 | 1 | 2 | 3 | 4 |
| First layer | A | B | B | C | D | F | F | G | Clear layer only |

TABLE 2-continued

|  | Example No. | | | | | Comparative Example No. | | | |
| --- | --- | --- | --- | --- | --- | --- | --- | --- | --- |
|  | 1 | 2 | 3 | 4 | 5 | 1 | 2 | 3 | 4 |
| Second layer (Color tone) | C | E | C | C | None | G | H | None |  |
| L | 90.5 | 90.2 | 90.7 | 91.0 | 90.5 | 91.0 | 90.1 | 90.5 | 88.0 |
| a | 0.05 | 1.00 | 0.10 | 0.60 | 0.30 | −1.50 | −1.00 | −0.50 | −0.60 |
| b | −8.30 | −7.50 | −9.00 | −8.50 | −8.00 | −10.50 | −6.00 | −8.50 | −8.80 |
| Wcie | 118 | 110 | 120 | 118 | 116 | 128 | 105 | 120 | 118 |
| Tw | 4.8 | 2.8 | 4.5 | 3.9 | 4.0 | 8.5 | 5.2 | 5.6 | 6.1 |
| Wcie/Tw | 24.6 | 39.3 | 26.7 | 30.3 | 29.0 | 15.1 | 20.2 | 21.4 | 19.3 |
| Feature of appearance | 4 | 3 | 4 | 4 | 4 | 2 | 1 | 2 | 2 |
| Bond strength after weathering test | ⊙ | ⊙ | ⊙ | ⊙ | ⊙ | ⊙ | ⊙ | ⊙ | x |

TEST METHOD (1) Measurement of color tone

Colorimeter CR221 manufactured by Minolta Co. (visual field of 2°, 3 mm φ, light source $D_{65}$), according to Y x y measurement The formula of whiteness degree of CIE.ISO:

$$Wcie = Y + 800 (X_0 - X) + 1700 (Y_0 - Y)$$

$$Tw = 1000 (X_0 - X) - 650 (Y_0 - Y)$$

wherein $X_0$ and $Y_0$ are respectively chromaticity coordinate of perfect diffuser of $D_{65}$ lighting, $X_0$ is 0.3127 and $Y_0$ is 0.3291.

(2) Visual observation (feature of appearance)

Whiteness was evaluated by 200 random panelists according to the following criteria:

4: considerably white

3: white

2: white but contains some other color

1: yellowish white (3) Measurement of bond strength after weathering test

A coated golf ball was struck against a iron plate at a speed of 45 m/second, 50 times after treating with a sunshine weatherometer for 120 hours. Thereafter, a bond strength of a paint layer was measured.

⊙: No peeling x: Severe peeling

What is claim is:

1. A coated golf ball in which the golf ball body having a cover mainly composed of an ionomer resin is coated with at least one white paint layer containing a white paint said white paint comprising 3 to 15% by weight of a white pigment, 0.0005 to 0.0250% by weight of a blue pigment and 0.001 to 0.010% by weight of a red pigment based on 100% by weight of the solid content of the white paint layer coating, the weight ratio of the blue pigment to the red pigment being 0.1 to 2.0.

2. The coated golf ball according to claim 1, wherein the color tone of the coated golf ball has an L value of 85 to 95, an a value of 0 to 2.0, a b value of −6.5 to −10.0 and a Wcie value representing whiteness of 108 to 125.

3. The coated golf ball according to claim 1, wherein the white paint comprises 5 to 12% by weight.

4. The coated golf ball according to claim 1, wherein the white paint further contains 0.1 to 10% by weight of various additives.

5. The coated golf ball according to claim 1, wherein the blue pigment is present in an amount of 0.0008 to 0.020% by weight.

6. The coated golf ball according to claim 1, wherein the red pigment is present in an amount of 0.0012 to 0.008% by weight.

7. The coated golf ball according to claim 1, wherein the a value is 0.05 to 1.5 and the b value is −7.0 to −9.5.

8. The coated golf ball according to claim 1, wherein the ionomer resin is further coated with at least one clear paint layer.

* * * * *